United States Patent
Pibarot et al.

(10) Patent No.: US 12,239,146 B2
(45) Date of Patent: Mar. 4, 2025

(54) MEAT ANALOGUES AND MEAT ANALOGUE EXTRUSION DEVICES AND METHODS

(71) Applicants: Societe des Produits Nestle S.A., Vevey (CH); Institut National de Recherche Pour l'Agriculture, l'Alimentation et l'Environnement (INRAE), Paris (FR); Universite de Montpellier, Montpellier (FR)

(72) Inventors: Patrick Pibarot, Territet (CH); Christophe Joseph Etienne Schmitt, Servion (CH); Marie-Helene Morel, Montpellier (FR); Christian Sanchez, Montpellier (FR)

(73) Assignees: Societe des Produits Nestle S.A., Vevey (CH); Institut National de Recherche Pour l'Agriculture, l'Alimentation et l'Environnement (INRAE), Paris (FR); Universite de Montpellier, Montpellier (FR)

( * ) Notice: Subject to any disclaimer, the term of this patent is extended or adjusted under 35 U.S.C. 154(b) by 600 days.

(21) Appl. No.: 17/601,827

(22) PCT Filed: Apr. 8, 2020

(86) PCT No.: PCT/EP2020/060087
§ 371 (c)(1),
(2) Date: Oct. 6, 2021

(87) PCT Pub. No.: WO2020/208104
PCT Pub. Date: Oct. 15, 2020

(65) Prior Publication Data
US 2022/0192223 A1    Jun. 23, 2022

Related U.S. Application Data

(60) Provisional application No. 62/831,820, filed on Apr. 10, 2019.

(51) Int. Cl.
  *A23J 3/22*    (2006.01)
  *A23J 3/14*    (2006.01)
  (Continued)

(52) U.S. Cl.
  CPC ............... *A23J 3/227* (2013.01); *A23J 3/14* (2013.01); *A23J 3/26* (2013.01); *A23P 30/25* (2016.08)

(58) Field of Classification Search
  CPC ...... A23J 3/227; A23J 3/14; A23J 3/26; A23J 3/22; A23J 3/04; A23J 3/265;
  (Continued)

(56) References Cited

U.S. PATENT DOCUMENTS

| | | | | |
|---|---|---|---|---|
| 2,704,521 A | * | 3/1955 | Sharp et al. ........... | C11D 13/10 425/308 |
| 2,802,737 A | * | 8/1957 | Mortimer ................ | A23J 3/227 426/89 |

(Continued)

FOREIGN PATENT DOCUMENTS

| | | |
|---|---|---|
| JP | 2016532447 A | 10/2016 |
| WO | 9634539 | 11/1996 |

(Continued)

OTHER PUBLICATIONS

Thermo Process 11 Analog Meat Applications 2020 Web retrieved: https://www.youtube.com/watch?v=MXRb2r8X-gl (Year: 2020).*

(Continued)

*Primary Examiner* — Drew E Becker
*Assistant Examiner* — Luis Eugenio Diou Berdecia
(74) *Attorney, Agent, or Firm* — K&L Gates LLP

(57) ABSTRACT

A meat analogue may include a macrostructure of connected sheared fibers oriented parallel to one another and gaps positioned between the sheared fibers. The macrostructure may not include meat and may include a vegetable protein.

(Continued)

An extrusion system may include an extruder and a die. The extrusion system may produce a meat analogue. A meat analogue may include a plant protein. The extruder may be connectable to the die. The extrusion system may be configured to direct a material including a vegetable protein from the extruder to the die and through a fluid path extending through the die. The die may be configured to inject a fat or a fat analogue into the material such that the fat or the fat analogue is embedded but visually distinct from the material including the vegetable protein when the fat or the fat analogue and the material exit the die.

12 Claims, 14 Drawing Sheets

(51) Int. Cl.
    *A23J 3/26*     (2006.01)
    *A23P 30/25*     (2016.01)

(58) Field of Classification Search
    CPC .......... A23P 30/25; A23P 30/20; A23P 10/25;
               A23P 30/34; A23K 20/147; A23K 40/25;
                A23K 50/48; A23L 33/185; A23L 33/17;
                A23L 7/17; Y10S 100/91; A47J 9/007;
                A23V 2300/16; B29C 44/505; B29C
            44/507; B29C 48/00; B29C 48/147; B29C
                48/1472; B29C 48/2515; B29C 48/49;
                B29C 48/0014; B29C 48/0019; B29C
              48/002; B29C 44/3473; B29C 44/465;
                B29C 48/13; B29C 48/305; B29C 48/07
    USPC .... 426/656, 448, 516, 104, 376.1, 634, 802,
                426/629, 512; 425/326.1, 325, 131.1;
                        99/532, 516, 477, 349, 483
    See application file for complete search history.

(56) References Cited

U.S. PATENT DOCUMENTS

| | | | | |
|---|---|---|---|---|
| 2,830,902 A * | 4/1958 | Mortimer | A23J 3/28 | 426/89 |
| 3,123,482 A * | 3/1964 | Lieberman | D01F 4/00 | 426/514 |
| 3,175,909 A * | 3/1965 | Elmquist | A23J 3/28 | 426/802 |
| 3,488,770 A * | 1/1970 | Atkinson | A23J 3/227 | 426/802 |
| 3,693,533 A * | 9/1972 | Liepa | A23J 3/227 | 425/371 |
| 3,840,679 A * | 10/1974 | Liepa et al. | A23J 3/227 | 426/802 |
| 3,886,298 A * | 5/1975 | Hayes, Jr. | A23J 3/227 | 426/507 |
| 3,911,159 A * | 10/1975 | Heusdens | A23J 3/265 | 426/802 |
| 3,914,459 A * | 10/1975 | Jones | A23L 13/67 | 426/76 |
| 3,930,033 A * | 12/1975 | Corliss | A23J 3/227 | 426/103 |
| 3,935,319 A * | 1/1976 | Howard | A23J 3/227 | 426/802 |
| 3,988,485 A * | 10/1976 | Hibbert | A23J 3/227 | 426/802 |
| 4,000,323 A * | 12/1976 | Youngquist | A23J 3/227 | 426/802 |
| 4,001,441 A * | 1/1977 | Liepa | A23J 3/22 | 426/802 |
| 4,029,823 A * | 6/1977 | Bone | A23J 3/227 | 426/272 |
| 4,042,715 A * | 8/1977 | Wenger | A23J 3/227 | 426/802 |
| 4,057,656 A * | 11/1977 | Spiel | A23J 3/227 | 426/802 |
| 4,099,455 A * | 7/1978 | Wenger | A23J 3/227 | 426/802 |
| 4,125,630 A * | 11/1978 | Orthoefer | A23J 3/22 | 426/802 |
| 4,245,552 A * | 1/1981 | Small | A23J 3/26 | 99/477 |
| 4,277,513 A * | 7/1981 | Rufer | A23J 3/24 | 426/243 |
| 4,324,807 A * | 4/1982 | Kim | A23J 3/227 | 426/802 |
| 4,328,252 A * | 5/1982 | Murray | A23J 3/28 | 530/820 |
| 4,338,340 A * | 7/1982 | Morimoto | A23J 3/26 | 426/802 |
| 4,422,372 A * | 12/1983 | Hoezee | B30B 11/227 | 241/82.5 |
| 4,542,686 A * | 9/1985 | Bansal | A23K 40/25 | 99/483 |
| 4,863,749 A * | 9/1989 | Yamada | A23J 3/227 | 426/802 |
| 4,868,002 A * | 9/1989 | Scaglione | A23L 13/67 | 425/308 |
| 4,883,421 A * | 11/1989 | Morgan | A23L 13/67 | 264/108 |
| 4,910,040 A * | 3/1990 | Sagarino | A23J 3/26 | 426/549 |
| 5,068,117 A * | 11/1991 | McCabe | A23L 11/35 | 426/802 |
| 5,110,611 A * | 5/1992 | Stahl | A23P 10/25 | 426/512 |
| 5,126,157 A * | 6/1992 | Burwell | A23G 1/202 | 426/516 |
| 5,129,315 A * | 7/1992 | Burwell | A23G 1/202 | 99/450.2 |
| 5,183,683 A * | 2/1993 | Mott | A23J 3/22 | 426/802 |
| 5,206,050 A * | 4/1993 | Jennings | A23L 15/35 | 426/802 |
| 5,225,233 A * | 7/1993 | Komatsu | A23P 30/10 | 426/468 |
| 5,431,927 A * | 7/1995 | Hand | A23K 40/25 | 426/805 |
| 5,500,239 A * | 3/1996 | Hayward | A23P 30/20 | 425/464 |
| 5,565,234 A * | 10/1996 | Teraguchi | A23L 13/30 | 426/656 |
| 5,607,710 A * | 3/1997 | De Ruyter | A23J 3/227 | 426/241 |
| 5,639,485 A * | 6/1997 | Weinstein | A21C 11/163 | 426/516 |
| 5,676,987 A * | 10/1997 | Lai | A23L 29/212 | 426/802 |
| 5,888,555 A * | 3/1999 | El-Sobky | B29C 48/131 | 264/108 |
| 5,888,558 A * | 3/1999 | Janot | A23P 30/20 | 425/313 |
| 5,919,509 A * | 7/1999 | Cremers | A21C 11/163 | 425/464 |
| 5,922,392 A * | 7/1999 | Kelly | A23J 3/18 | 426/656 |
| 6,319,539 B1 * | 11/2001 | Shemer | A23J 3/16 | 426/450 |
| 6,379,738 B1 * | 4/2002 | Dingman | A23L 13/52 | 426/574 |
| 6,770,318 B1 * | 8/2004 | Roussell | A23L 17/70 | 426/643 |
| 6,887,503 B1 * | 5/2005 | Rasmussen | A23G 3/0021 | 426/94 |
| 7,070,827 B2 * | 7/2006 | Cavallini | A23J 3/16 | 426/574 |
| 8,926,308 B2 * | 1/2015 | Mihalos | B29C 48/0022 | 425/207 |

(56) References Cited

U.S. PATENT DOCUMENTS

| | | | | |
|---|---|---|---|---|
| 2002/0106442 A1* | 8/2002 | Dingman | A23L 13/60 | 426/646 |
| 2003/0003194 A1* | 1/2003 | Roussel | A23J 3/227 | 426/89 |
| 2003/0090026 A1* | 5/2003 | Rasmussen | B29C 48/475 | 264/173.14 |
| 2005/0048180 A1* | 3/2005 | Moore | B29C 48/05 | 426/516 |
| 2005/0118304 A1* | 6/2005 | Rasmussen | A23G 3/50 | 426/94 |
| 2005/0196502 A1* | 9/2005 | Alexander | B26D 3/28 | 426/518 |
| 2005/0266147 A1* | 12/2005 | Yao | A23J 3/227 | 426/656 |
| 2006/0035006 A1* | 2/2006 | McMindes | A23L 13/426 | 426/646 |
| 2006/0073261 A1* | 4/2006 | McMindes | A23L 13/426 | 426/646 |
| 2007/0269567 A1* | 11/2007 | McMindes | A23L 19/09 | 426/601 |
| 2007/0269583 A1* | 11/2007 | McMindes | A23J 3/16 | 426/656 |
| 2008/0014330 A1* | 1/2008 | Chen | A23J 3/227 | 426/656 |
| 2009/0123629 A1* | 5/2009 | Chang | A23C 20/025 | 426/573 |
| 2009/0208612 A1* | 8/2009 | Reiser | A23J 3/18 | 426/74 |
| 2010/0074989 A1* | 3/2010 | Manski | A23J 3/222 | 426/656 |
| 2010/0074998 A1* | 3/2010 | Espeleta Vega | A23L 13/67 | 426/574 |
| 2010/0136201 A1* | 6/2010 | Bigeard | A23P 30/20 | 426/465 |
| 2010/0166940 A1* | 7/2010 | McMindes | A23L 7/109 | 530/402 |
| 2012/0040059 A1* | 2/2012 | Saylock | A23L 17/70 | 426/574 |
| 2012/0093994 A1* | 4/2012 | Hsieh | A23J 3/16 | 426/549 |
| 2013/0209614 A1* | 8/2013 | Doare-Broux | A23K 10/30 | 426/87 |
| 2014/0010920 A1* | 1/2014 | Nishimura | A23J 3/22 | 426/63 |
| 2014/0127363 A1* | 5/2014 | Giezen | A23J 3/16 | 426/104 |
| 2015/0044334 A1* | 2/2015 | Walther | A23P 30/20 | 426/63 |
| 2015/0072056 A1* | 3/2015 | Le Paih | A21C 11/103 | 426/516 |
| 2015/0374024 A1* | 12/2015 | Wearly | A23P 30/20 | 426/516 |
| 2016/0073671 A1* | 3/2016 | Geistlinger | A23L 27/26 | 426/61 |
| 2016/0205985 A1* | 7/2016 | Walther | A23P 30/20 | |
| 2016/0205986 A1* | 7/2016 | Walther | A23J 3/16 | |
| 2017/0035076 A1* | 2/2017 | Geistlinger | A23L 31/10 | |
| 2018/0027851 A1* | 2/2018 | Vrljic | A23L 13/424 | |
| 2018/0064137 A1* | 3/2018 | Trottet | A23L 29/212 | |
| 2018/0077950 A1* | 3/2018 | Heck | A23J 3/26 | |
| 2018/0098557 A1* | 4/2018 | Walther | A23J 3/14 | |
| 2019/0082716 A1* | 3/2019 | Murata | A23J 3/26 | |

FOREIGN PATENT DOCUMENTS

| | | | | |
|---|---|---|---|---|
| WO | 9849902 | | 11/1998 | |
| WO | WO-03007729 A1 * | | 1/2003 | A23J 3/26 |
| WO | WO-2014080271 A2 * | | 5/2014 | A21C 11/16 |
| WO | 2015020660 | | 2/2015 | |
| WO | WO-2015020660 A1 * | | 2/2015 | A21C 11/20 |
| WO | 2016150834 | | 9/2016 | |
| WO | WO-2018185318 A1 * | | 10/2018 | A23J 3/227 |

OTHER PUBLICATIONS

Anonymous "Vegan Steaks" Nov. 10, 2017, Mintel, retrieved from www.gnpd.com Database accession No. 5237799, XP055716065, 5 pages.

Japanese Office Action for Appl No. 2021-559678 dated May 7, 2024, 4 pages.

* cited by examiner

181

MEAT ANALOGUES AND MEAT ANALOGUE EXTRUSION DEVICES AND METHODS

CROSS REFERENCE TO RELATED APPLICATIONS

The present application is a National Stage of International Application No. PCT/EP2020/060087, filed on Apr. 8, 2020, which claims priority to U.S. Provisional Patent Application No. 62/831,820, filed on Apr. 10, 2019, the entire contents of which are being incorporated herein by reference.

TECHNICAL FIELD

The present disclosure relates generally to meat analogues containing vegetable protein, methods of making such analogues, meat analogue extrusion devices, and methods of using such devices. More particularly, the present disclosure further relates to meat analogues with a fibrous macrostructure and voids in the macrostructure where fat is injected into the voids.

BACKGROUND

Existing processes for manufacturing food products that have the appearance and texture of meat ("meat analogues") mainly use wheat gluten or soy protein isolates in an extrusion process. However, the way that these proteins achieve fibrous or lamellar structure is not well understood, and therefore formula modification or development of new products with specific structures is difficult.

For example, the replacement of animal protein by other protein sources such as vegetable protein leads to products of unsatisfactory structure and texture. As a result, the shape, texture and structure of reconstituted fibrous meat pieces are limited. Meat analogues having a structure and a texture corresponding to beef, for example a marbled meat, lamb or pork meat or any other reference meat are more difficult to manufacture.

These difficulties are principally due to the non-control of protein aggregation during the heating and cooling processes associated with the production of the meat analogues. Cooling of melted protein may result in similar rheological and biochemical behavior as non-analogues and thus may result in the same kind of structure. However, some differences may be present in firmness and/or elasticity for mouth texture, but with minimal differences in visual structure.

In addition to flavor, control of both firmness/elasticity and visual properties is necessary to reproduce meat analogue that achieves good palatability and/or human consumer acceptance. Current processes and formula are not able to create structures and texture differences beyond existing meat analogue products.

Protein is a key component of the diet. It is the major source of nitrogen for the body. Dietary proteins should provide essential amino acids necessary for the growth, maintenance and repair of the body. The recommended daily protein intake for healthy adults with standard physical activity is 0.83 g of protein/kg body weight/day. In addition to the quantity of protein in the diet; the quality of the protein is important since 9 out of 20 amino acids are essential and cannot be produced by the human body. It is therefore important to consider the composition of a dietary protein source when included in the diet to ensure that the amino acid profile is complete.

With respect to protein quality, animal protein sources such as meat, egg or milk are complete sources because they contain the 9 essential amino acids in an appropriate amount. This is also the case for some plant protein sources such as soy, canola or potato. However, some other plant proteins are lacking essential amino acids such as lysine for cereals (e.g. corn, wheat, rice) and cysteine/methionine for legumes (e.g. pea, lentils, chickpea). The plant proteins lacking the essential amino acids should therefore be combined in the diet to cover the metabolic needs of the human body.

To ensure sustainable supply of proteins, plant-based meat analogues offer an interesting alternative. However, current products are lacking the taste and texture of red meat, especially red meat such as marbled beef steak. In addition, the variety of products offered to consumers is low and the products may be perceived by consumers as too processed.

SUMMARY

When considering the structure and texture of red meat, a striking feature is the complex hierarchical and multiscale structure of the muscular tissue, which is composed by protein fibrils of actin and myosin embedded in a collagen-based connective tissue. A key structural characteristic of the protein fibrils is that they may reach several centimeters in length and are responsible for chewiness of the meat.

In addition to the muscular protein structure, red meat exhibits inclusions of fat tissue within and without the protein matrix. This complex architecture may drive the appearance of the meat as well as texture and juiciness of the meat.

Moreover, together with the protein fibrils and the fat inclusions, red meat contains globular proteins such as hemoglobin distributed within the serum contained in the network structure and several vitamins and minerals dispersed within the matrix.

When designing meat analogues to satisfy consumers, it may be beneficial to integrate all the structural, textural and nutritional aspects of red meat such as marbled meat. For example marbled meat may include the complex hierarchical and multiscale structure of the muscular tissue, the inclusions of fat tissue within the protein matrix, and the globular proteins distributed within the serum contained in the network structure.

Accordingly, Applicant surprisingly and unexpectedly developed a meat analogue that may visually achieve marbling, defined as the intermingling or dispersion of fat within the lean beef, that achieves a beef quality grade of "USDA Prime." A USDA Prime grade may be given to a beef ribeye muscle at a cut surface after a beef carcass has been ribbed between the 12th and 13th ribs that has a high amount and distribution of marbling (defined as abundant or moderately abundant marbling, where beef with a low USDA grade may only have trace, slight, or is devoid of marbling).

Further in this regard, the present disclosure provides advantages and solutions to problems in existing technologies for meat analogues and meat analogue extrusion devices and methods. For example, a meat analogue may include a fibrous macrostructure comprising voids in the macrostructure where the voids are injected with a fat and/or a fat analogue. Meat analogue extrusion devices and methods of using such devices may achieve the fibrous macrostructure and inject fat into the voids of the fibrous macrostructure. In a preferred embodiment, a meat analogue comprises a parallel fibrous macrostructure where the meat analogue fibers include fibers that are substantially parallel to one another.

In an embodiment, a die may have a configuration (for example, a "coat hanger die" configuration) that may receive a plant-based, protein-containing dough for high moisture extrusion at a high temperature that, after the extrusion, may form a thin slab meat analogue with meaty texture and appearance.

In an embodiment, a natural colorant and flavor component may be injected into the dough during and/or after an extrusion process. In an embodiment, one or more natural colorants such as lycopene from tomato or betaine from beetroot and/or a mixture thereof used to simulate a natural meat color of a meat analogue. For example, the meat analogue make take the form of a marbled beef steak including a red-brown coloring, steak-like shape such as ribeye or top loin, and contain regions of meat analogue visually distinct from regions of fat and/or fat analogues. In such an embodiment, the visually distinct regions comprise different formulations relative to each other (i.e., vegetable protein or fat).

In an embodiment, a meat analogue with organoleptic properties the same or substantially similar to animal meat cold cuts with improved taste and in mouth perception may be produced as disclosed herein. In a preferred embodiment, the meat analogue does not comprise a meat and/or an animal protein.

In an embodiment, the raw ingredients used to form the meat analogue may include protein, protein particles (e.g., texturized vegetable proteins) and water. The particles may be insoluble particles of vegetable and mineral origin. In one embodiment, the particle may include pea hull.

In an embodiment, the method of making the meat analogue comprises heating of a dough which comprises subjecting the dough to an extruder operating with at least one parameter selected from the group consisting of a speed of about 50 to about 100 rpm, a mass flow of about 15 kg/h to about 25 kg/h and a temperature of about 140 to about 250° C. The dough can be prepared in a location selected from the group consisting of (i) a mixer from which the dough can be pumped into the extruder and (ii) the extruder (e.g., by separately feeding powder and liquid into the extruder)

In an embodiment, the method comprises directing a dough (e.g., an extruded dough) through a die selected from the group consisting of a coat hanger die, a fish-tail die, and a combination thereof. The method may comprise maintaining a temperature of the die at about 70° C. to about 95° C. In an embodiment, method may comprise maintaining a temperature of the die at about below about the boiling temperature of water according to a temperature and a pressure in the meat analogue at the exit of the die.

In an embodiment, fibers may be organized in a die when a lateral expansion and/or contraction of a dough in a direction substantially perpendicular to the direction of flow, for example within about +/−15 degrees to the direction perpendicular to the direction of the flow through the die, creates a periodical flow instability in the die. The periodical flow instability may result in a pressure oscillation due to flow instabilities. When the properties of the pressure oscillation are maintained when the dough exits the die (when the dough may be referred to as a meat analogue), a sheared fiber and gap structure may be created in the dough and/or meat analogue.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
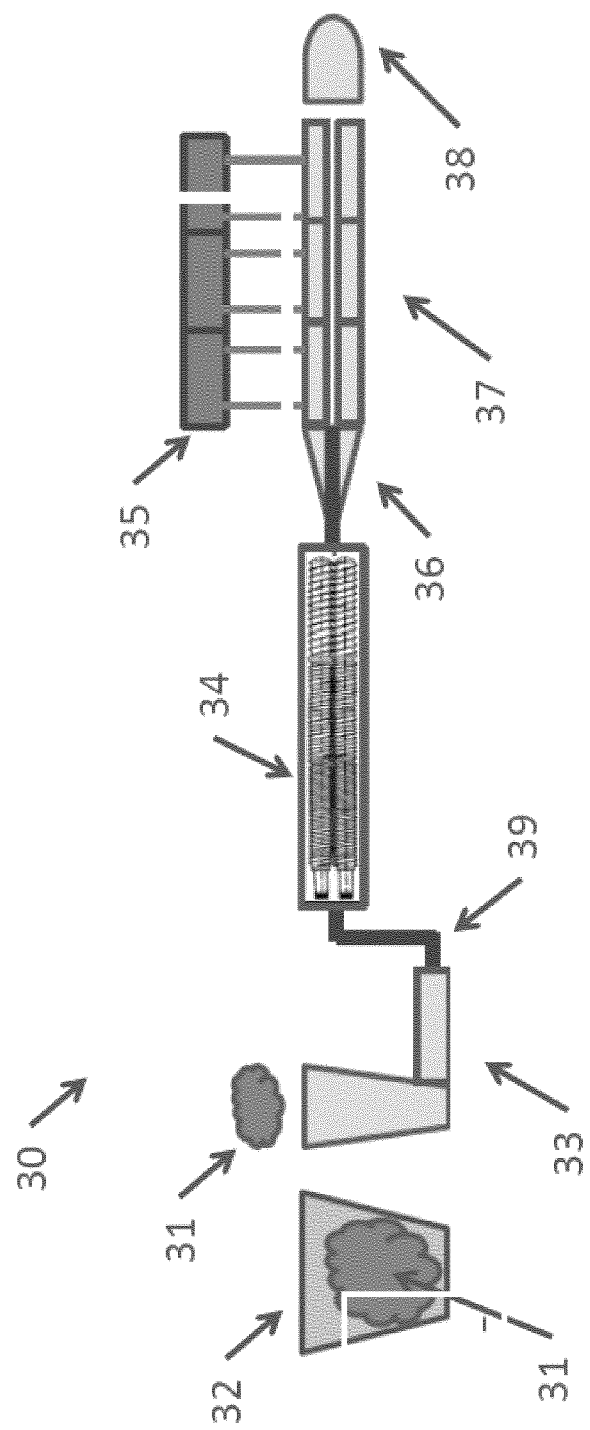
FIG. 1 illustrates an embodiment of a meat analogue extrusion system according to the present disclosure.

Detailed embodiments of products, devices and methods are disclosed herein. However, it is to be understood that the disclosed embodiments are merely exemplary of the devices and methods, which may be embodied in various forms. Therefore, specific functional details disclosed herein are not to be interpreted as limiting, but merely as a basis for the claims as a representative example for teaching one skilled in the art to variously employ the present disclosure.

As used herein, the singular forms "a," "an" and "the" include plural referents unless the context clearly dictates otherwise. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the meat analogue and/or the corresponding emulsion unless expressed otherwise. When reference is made to the pH, values correspond to pH measured at 25° C. with standard equipment.

The terms "food," "food product" and "food composition" mean a product or composition that is intended for ingestion by an animal, including a human, and provides at least one nutrient to the animal. The term "pet food" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The term "companion animal" means a dog or a cat.

A "blended" composition merely has at least two components having at least one different characteristic relative to each other, preferably at least moisture content and water activity in the context of the present disclosure. In this regard, description of a composition as "blended" does not imply that the blended composition has been subjected to processing sometimes referenced as "blending," namely mixing components so that they are indistinguishable from each other, and preferably such processing is avoided when mixing the meat analogue with another comestible composition (e.g., a gravy or broth) to form the blended composition disclosed herein.

A "homogenous" structure is a structure of a meat analogue that is uniformly distributed along any direction or axis of the meat analogue. For example, a homogenous structure does not have a grain direction. Conversely, a "non-homogenous" structure of a meat analogue is non-uniform along at least one direction or axis of the meat analogue. For example, a non-homogenous structure has a grain direction.

A "dry" food composition has less than 10 wt. % moisture and/or a water activity less than 0.64, preferably both. A "semi-moist" food composition has 11 wt. % to 20 wt. % moisture and/or a water activity of 0.64 to 0.75, preferably both. A "wet" food composition has more than 20 wt. % moisture and/or a water activity higher than 0.75, preferably both.

A "meat analogue" is an emulsion product that resembles one or more pieces of natural meat in appearance, texture, and physical structure. As used herein, a meat analogue does not include meat; for example, a meat analogue that lacks meat may instead use vegetable protein such as gluten to achieve the appearance, texture, and physical structure of meat.

In the context of this document, meat analogues are preferably plant protein-based food products, which can substitute for pieces of red meat by mimicking the structure, texture, and taste of red meat. A specific feature of the meat analogues disclosed herein is the presence of a macroscopic fibrillar protein-based structure. Additionally or alternatively, meat analogues may contain a fat and/or fat analogue injected in voids within the macroscopic fibrillar protein-based structure. The fat and/or fat analogue content may range from 0% to about 100% by weight of the meat analogue. The plant and/or vegetable protein based content may range from 0% to 100% by weight of the meat analogue.

The preferred embodiments relate to meat analogues containing vegetable protein, methods of making such analogues, meat analogue extrusion devices, and methods of using such devices. More particularly, the present disclosure relates to meat analogues and meat analogue extrusion devices and methods for extruding meat analogues with a fibrous protein-gap macrostructure and/or a protein-fat macrostructure where fat is injected into the gaps within the protein-gap macrostructure.

The fibrillar meat analogue as described herein may be further used as basis to produce other meat analogues such as burger, minced meat, bacon, cold cuts, and sausages.

Figure 5:
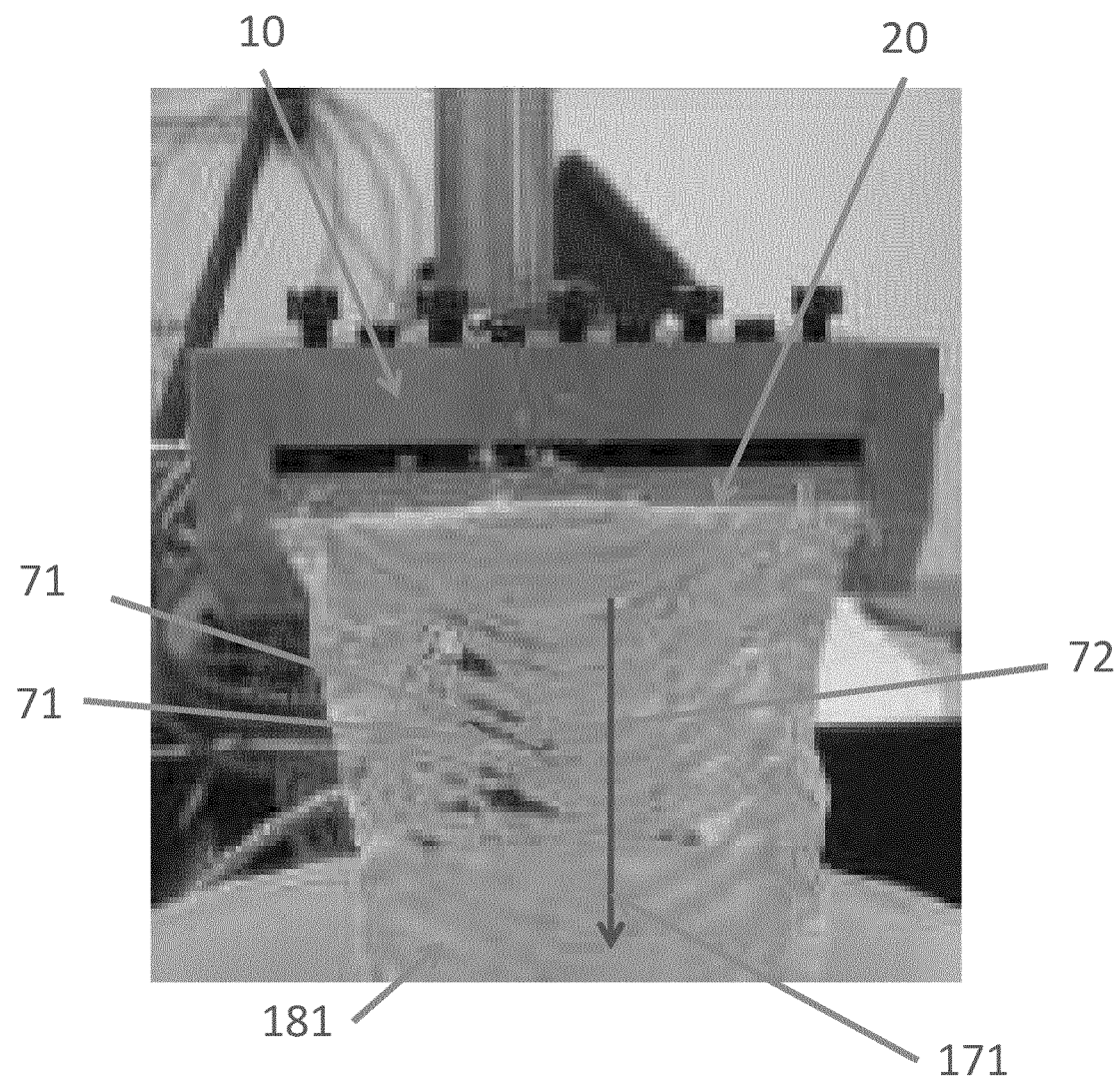
FIG. 5 illustrates an embodiment of a processed food analogue with sheared fibers according to the present disclosure.
Figure 9:
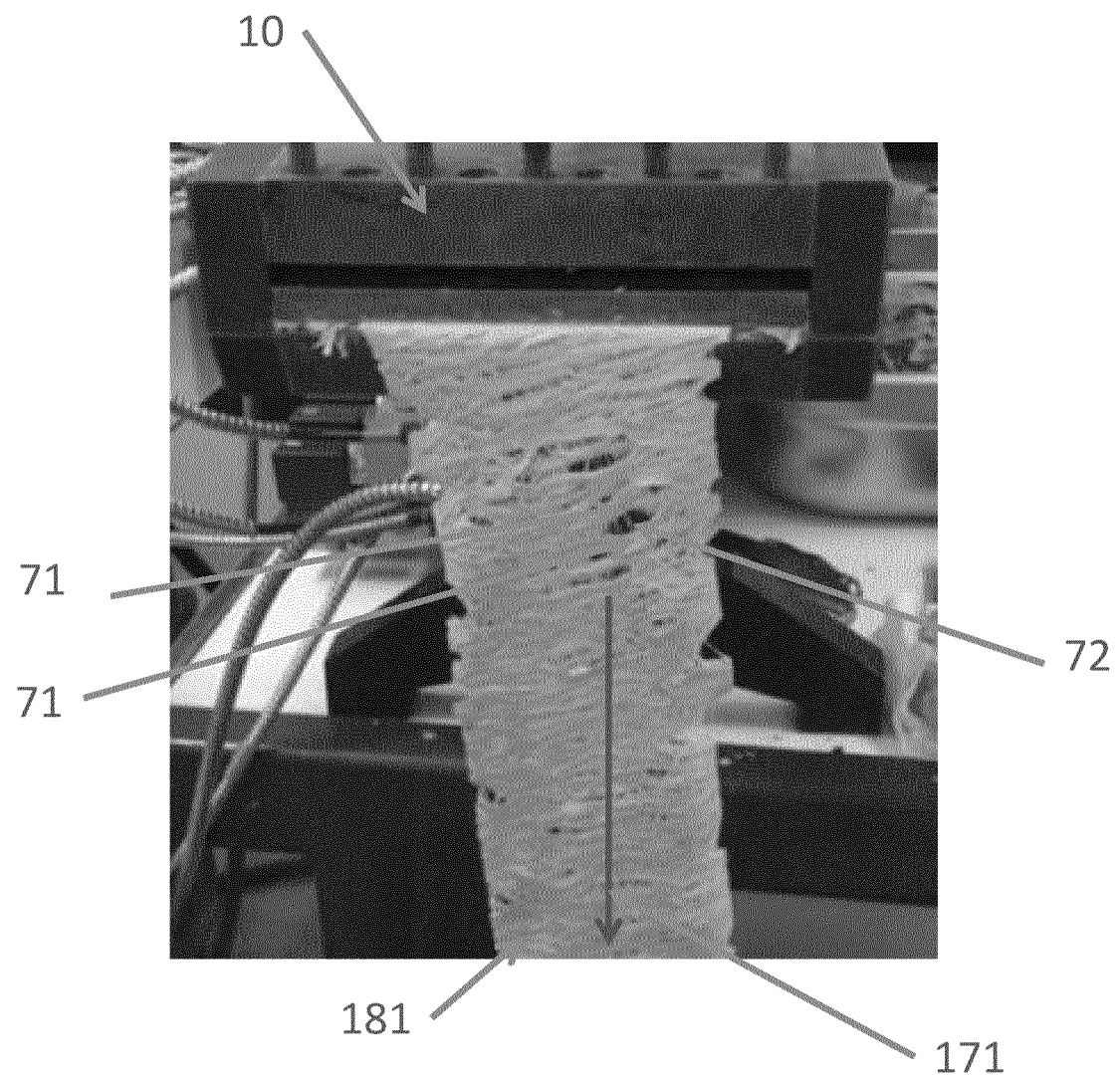
FIG. 9 illustrates an embodiment of a meat analogue with a sheared fiber and gap structure.

For example, FIGS. 5 and 9 illustrate embodiments of a die 10. The die 10 may include a line connection that directs a meat analogue into the die 10 for processing. The line connection may connected to other elements of a meat analogue production system to receive raw and/or preprocessed meat analogue for processing and/or further processing in the die 10.

The die 10 may be manufactured from a metal (i.e., aluminum, stainless steel), a plastic (i.e., Polyethylene Terephthalate, High-Density Polyethylene), an organic material (i.e., wood, bamboo), a composite (i.e., ceramic matric composite), other material and combinations thereof. The die 10 may be manufactured through extrusion, machining, casting, 3D printing, and combinations thereof. The die 10 may be coated with a material. For example, the die 10 may be coated with a material to prevent bacterial and/or particulate buildup on the die 10.

As described herein, the die 10 may be composed of various parts or elements assembled together to form the die 10. In an embodiment, the die 10 is a single piece, for example a single piece that has been 3-D printed and/or a single piece that has been Computer Numeric Controlled ("CNC") machined from a single block of base material.

In a preferred embodiment, the meat analogue may enter the die 10 from the line connection and be extruded from the die 10. Then, the extruded meat analogue may exit the die 10 through the gap 20, as shown in FIG. 5.

When the meat analogue passes through the die 10 and is extruded, a pressure may be exerted on the meat analogue to pass the meat analogue through the die 10 thereby exerting a pressure on the die 10. In some embodiments, the die 10 may be required to withstand a pressure of about 40 to about 200 psi and preferably about 60 to about 100 psi. In an embodiment, the die 10 may be composed of multiple components held together and/or affixed using fasteners. The fasteners may be screws, snaps, bolts, clips, interlocks, and/or other fastening components.

FIG. 1 illustrates an embodiment of a meat analogue extrusion system 30 for processing the meat analogue. In an embodiment, the meat analogue is formed by a dough 31. The meat analogue extrusion system 30 may first preprocess the dough 31 at a dough preparation area 32. For example, the dough 31 may include multiple ingredients, and the multiple ingredients may require mixing prior to further processing. The mixing may be performed by hand and/or may be performed by a mechanical mixer, for example a blender.

The dough 31 may then be placed in a pump 33 of the meat analogue extrusion system 30. For example, the pump may be a piston pump. The dough 31 may be placed in the pump 33 by hand, and/or may be automatically transported from the dough preparation area 32 to the pump 33. The pump 33 may transmit the dough 31 through a line 39. The line 39 may be connected to an extruder 34. For example, the line 39 may be connected to a twin screw extruder. In an embodiment of the meat analogue extrusion system 30, the line 39 is not included, and the pump 33 is connected directly to the extruder 34.

The extruder 34 (e.g., a twin screw extruder) may apply a pressure to the dough 31 to move the dough 31 from a side of the extruder 34 with the pump 33 to an opposite side of the extruder 34. The extruder 34 may additionally or alternatively apply heat to the dough 31. The extruder 34 may additionally or alternatively be configured with an injection port (not shown) to inject water and/or another material into the dough 31 as the dough 31 moves through the extruder 34.

The extruder 34 (e.g., a twin screw extruder) may be connected to the die 10 of FIGS. 5 and 9. As shown in FIG. 1, the meat analogue extrusion system 30 comprising an exemplary embodiment of the die 10 may optionally include an inlet manifold 36, a cooling die 37, and/or one or more cooling devices 35. In other embodiments, the one or more cooling devices 35 and the inlet manifold 36 may not be included in the meat analogue extrusion system 30 comprising the exemplary embodiment of the die 10. In other embodiments, the cooling die 37 may be a short die. A short die may be a die where the length of the die (defined as the length a material travels through the die when the die is in use) is less than the width of the die (defined as the longest dimension of a planar section of the die outlet through which the material passes when exiting the die). For example, a short die may be about 9 inches long and about 15 inches wide.

The inlet manifold 36 may receive the dough 31 at an elevated pressure from the extruder 34. The inlet manifold 36 may orient the dough 31 to pass into the cooling die 37 (e.g., a short cooling die), for example, by converting a stream of the dough 31 from a substantially circular cross section to a substantially planar cross section (i.e., with a cross sectional area where the width is many times the height, for example where the width is about 20 times the height).

The inlet manifold 36 may be connected to the cooling die 37 (e.g., a short cooling die) configured to receive the dough 31 from the inlet manifold 36. The dough 31 may then pass, as propelled by the extruder 34 (e.g., a twin screw extruder), over the cooling die 37. The cooling die 37 may be maintained at a constant temperature. Additionally or alternatively, the cooling die 37 may be maintained at a temperature profile along the path of the dough 31 as the dough 31 moves through the cooling die 37. In general, the die 10 optionally including the cooling die 37 may be held at a constant temperature between about 40° C. and about 95° C. at normal atmospheric pressure. More preferably, the die 10 may be held between about 70° C. and about 95° C. For example, the die 10 may be held at a constant temperature of about 95° C., or about 85° C.

The cooling devices 35 may maintain a temperature of the cooling die 37 (e.g., a short cooling die). For example, the cooling die 37 may contain one or more cooling lines integrated within the cooling die 37 and connected to the one or more cooling devices 35. The one or more cooling devices 35 may include a fluid reservoir. The cooling devices 35 may direct a liquid (e.g., water, R134-a, and/or another refrigerant) through the cooling lines of the cooling die 37 to remove heat energy from the cooling die 37. The cooling die 37 may include a temperature sensor to sense the temperature of the cooling die 37. The one or more cooling devices 35 may adjust a fluid flow rate and/or a fluid temperature in reply to and/or based on feedback received from the temperature sensor. In an embodiment, multiple temperature sensors may be positioned along a flow path of the dough 31. After the extrusion, the dough 31 may be considered a meat analogue.

The meat analogue extrusion system 30 may further comprise a cutting tool 38. The cutting tool 38 may cut the dough 31 to a predetermined size and/or desired dimensions. For example, the cutting tool 38 may cut the dough 31 into strips, substantially circular forms, slices, steaks, and/or any other shape commonly associated with human and/or pet food, such as marbled beef steak.

Figure 2:
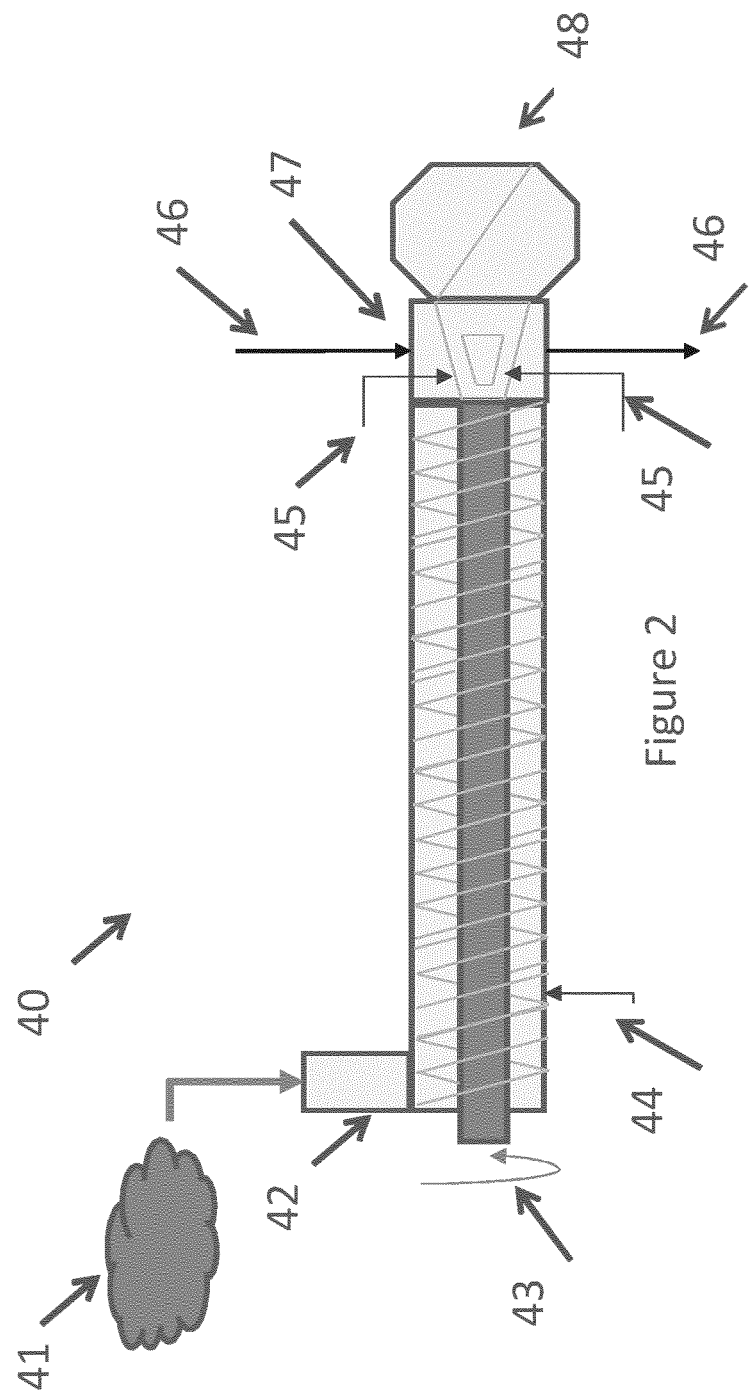
FIG. 2 illustrates a diagram depicting an embodiment of a meat analogue extrusion method according to the present disclosure.

FIG. 2 illustrates a diagram depicting an embodiment of a meat analogue extrusion method 40. For clarity, the various steps of the meat analogue extrusion method 40 have been shown as arrows in FIG. 2 on a diagram generally corresponding to the meat analogue extrusion system 30. The steps included herein have been assigned numerical identifiers, but the steps disclosed herein are not limited to being performed in the numerical order assigned by the step numbers. For example, step 46 may occur before, during and/or after step 47.

In step 41, a raw material may be introduced to the meat analogue extrusion system 30. The raw material may include a non-meat substance. The raw material may be the dough 31, the meat analogue, and/or a combination of two or more materials. Non-limiting examples of suitable non-meat protein substances include wheat protein (e.g., whole grain wheat or wheat gluten such as vital wheat gluten), corn protein (e.g., ground corn or corn gluten), soy protein (e.g., soybean meal, soy concentrate, or soy isolate), canola protein, rice protein (e.g., ground rice or rice gluten), cottonseed, peanut meal, pulse proteins (e.g. pea protein, faba bean protein), whole eggs, egg albumin, milk proteins, and mixtures thereof.

In some embodiments, the raw material comprises a non-meat protein such as gluten (e.g., wheat gluten). In some embodiments, the raw material comprises a non-meat protein that does not include gluten.

In some embodiments, the raw material may contain a soy-based ingredient, a corn-based ingredient or another cereal-based ingredient (e.g., amaranth, barley, buckwheat, fonio, millet, oats, rice, wheat, rye, sorghum, triticale, or quinoa).

In some embodiments, the raw material may comprise pea protein and faba bean protein, or may comprise pea protein, faba bean protein, and rice, or may comprise pea protein, faba bean protein, and gluten.

The raw material may optionally comprise a flour or a protein isolate. If flour is used, the raw material may include protein. Therefore, an ingredient may be used that is both a vegetable protein and a flour. Non-limiting examples of a suitable flour are a starch flour, such as cereal flours, including flours from rice, wheat, corn, barley, and sorghum; root vegetable flours, including flours from potato, cassava, sweet potato, arrowroot, yam, and taro; and other flours, including sago, banana, plantain, and breadfruit flours. A further non-limiting example of a suitable flour is a legume flour, including flours from beans such as favas, lentils, mung beans, peas, chickpeas, and soybeans. If a protein isolate is used, the raw material may include, for example, protein isolate from faba bean, lentils, or mung beans.

In some embodiments, the raw material may comprise a fat such as a vegetable fat. The fat may be used to fill voids in a processed meat analogue. The processed meat analogue may be referred to as a meat analogue matrix. A vegetable oil, such as corn oil, sunflower oil, safflower oil, rape seed oil, soy bean oil, olive oil and other oils rich in monounsaturated and polyunsaturated fatty acids, may be used. In some embodiments, a source of omega-3 fatty acids is included, such as one or more of fish oil, krill oil, flaxseed oil, walnut oil, or algal oil. In an embodiment, the raw material used to fill the voids in the meat analogue matrix may be a fat analogue (e.g., hydrocolloids, gellified emulsion of fat and protein), vegetable fibers, connective tissue analogue (e.g., protein gum matrices which have a similar structure to meat connective tissues).

In some embodiments, the raw material and/or fat may comprise sea animal based ingredients such as shrimp, fish and krill. In other embodiments, sea animal based ingredients may be substantially or completely absent from the raw material and/or fat.

The raw material may include other components in addition to proteins and flours, for example one or more of a micronutrient, a vitamin, a mineral, an amino acid, a preservative, a colorant and a palatant.

Non-limiting examples of a suitable vitamin include vitamin A, any of the B vitamins, vitamin C, vitamin D, vitamin E, and vitamin K, including various salts, esters, or other derivatives of the foregoing. Non-limiting examples of a suitable mineral include calcium, phosphorous, potassium, sodium, iron, chloride, boron, copper, zinc, magnesium, manganese, iodine, selenium, and the like.

Non-limiting examples of a suitable preservative include potassium sorbate, sorbic acid, sodium methyl para-hydroxybenzoate, calcium propionate, propionic acid, and combinations thereof. Non-limiting examples of a suitable colorant include FD&C colors, such as blue no. 1, blue no. 2, green no. 3, red no. 3, red no. 40, yellow no. 5, yellow no. 6, and the like; natural colors, such as roasted malt flour, caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. A non-limiting example of a suitable palatant is yeast.

The raw material may further include particles. The particles may include insoluble particles from non-animal origin for instance texturized vegetable proteins or micronized vegetable materials, hulls (for instance pea hulls), nuts, fibers (for instance carrot or wheat), calcium carbonate, and/or particles that yield strain softening which in turn accentuates the periodical instability. Non-limiting examples of suitable particle types are a pea hull, carrot fibers and calcium carbonate.

In step 42, the raw material may be transported by the system for further processing. In an embodiment, mixing processes for the raw material may be performed remotely relative to any extrusion and/or cutting process associated with the meat analogue extrusion system 40. Accordingly, the transportation step of step 42 may occur between any processing steps described herein and/or between any other processing steps known in the art. Locomotion of the raw material may occur through a tube. The tube may be manufactured from a metal and/or a plastic. Locomotion of the raw material through the tube may be performed by a pump, for example a screw pump, and/or by gravity.

In step 43, pressure may be applied to the raw material by the extruder 34 (e.g., a twin screw extruder), shown in FIG. 1. Referring again to FIG. 2, step 43 may include heating the raw material. Step 43 may further include moving the raw material from an inlet of the extruder 34 through an extrusion length of the extruder 34 and out of the extruder 34 into the die 10.

Step 43 of pressure application may further include injection step 44. Injection step 44 may include injection of water, one or more particle and/or one or more liquid ingredient. In an embodiment, the injection step 44 includes the injection of a fat and/or a material that has the appearance and/or properties of a fat. The injection of water, one or more particle and/or one or more liquid ingredient may occur while the raw material is moving along the extruder 34. In step 44 water and/or liquid may be injected into the extruder 34. The water, one or more particle and/or one or more liquid ingredient may mix with the raw material passing through the extruder 34.

In step 47, the raw material may be directed from the extruder 34 (e.g., a twin screw extruder) and into a die, for example the die 10. The raw material may be formed into a slab of raw material when forced through the die 10 by the extruder 34. In an embodiment, the die 10 includes holes for injecting a material into the raw material on a downstream end of the die 10. In an embodiment, step 45 includes the injection of a fat and/or a fat analogue. The fat and/or fat analogue may be injected to fill gaps between the fibrous macrostructure of the meat analogue. The size of the slab may be predetermined by adjusting the die 10 to a desired configuration.

Step 47 may optionally include steps 45 and 46. Step 45 may include injection of water, one or more particle and/or one or more liquid ingredient. The injection of water, one or more particle and/or one or more liquid ingredient may occur while the raw material is moving through the die 10.

Step 46 may include setting and/or maintaining a temperature of the die 10. The die 10 may contain one or more cooling lines (e.g., a plurality of cooling lines) integrated within the die 10 and connected to the one or more cooling devices 35. The one or more cooling devices 35 may direct a liquid through the one or more cooling lines of the die 10 to remove heat energy from the die 10. The die 10 may include a temperature sensor to sense the temperature of the die 10. The one or more cooling devices 35 may adjust a fluid flow rate and/or a fluid temperature in reply to and/or based on feedback received from the temperature sensor. In an embodiment, the flow rate may be adjusted by changing a speed of operation of the extruder 34 (e.g., a twin screw extruder). In an embodiment, multiple temperature sensors may be placed along the flow path of the raw material as the raw material moves through the die 10.

Step 48 may optionally be performed after the raw material has been directed through the die 10 to become a processed material. Step 48 may include cutting and/or molding the processed material using cutting and/or molding equipment. For example, cutting may include stamping the processed material to put the processed material into a substantially circular form associated with lunchmeat. As another example, the processed material may be directed into a mold to apply a shape to the processed material. For example, the processed material may be molded to the shape of a marbled beef steak. As another example, the processed material may be packaged, for example by directing the processed material into a plastic container and then sealing the plastic container with the processed material therein.

Figure 3:
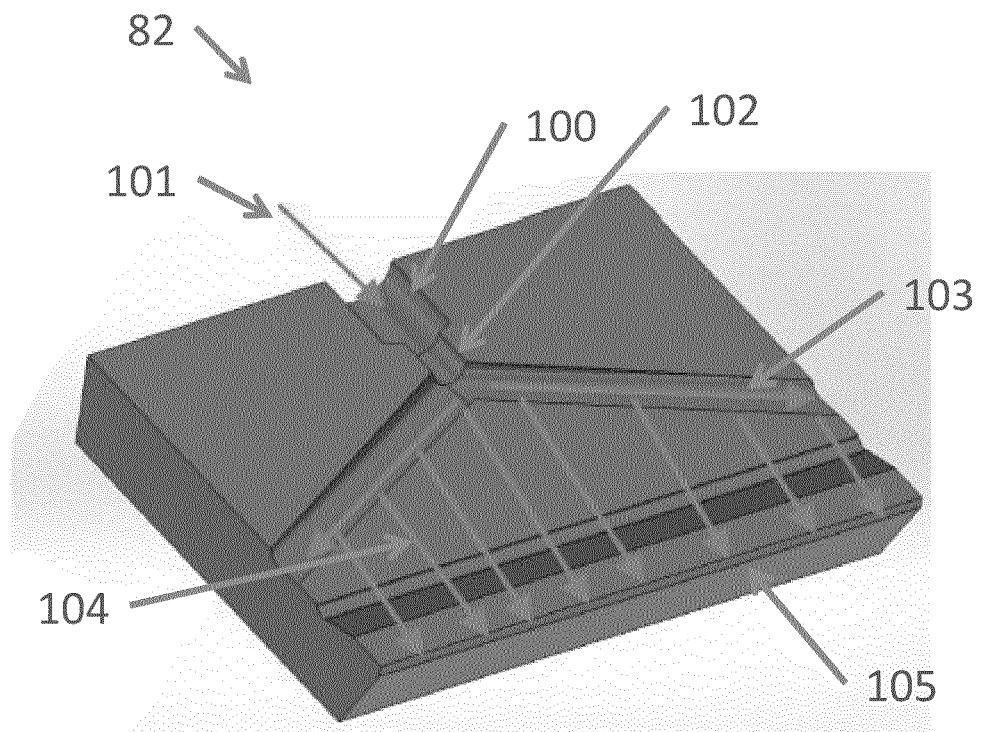
FIG. 3 illustrates an embodiment of a flow diagram of a meat analogue along a lower part of a die according to the present disclosure.

FIG. 3 illustrates an embodiment of direction of flow 101 of the dough 31 through the die 10. For illustrative purposes, a lower part 82 of the die 10 is shown. The direction of flow 101 shows how the dough 31 can move in the die 10 as the dough 31 moves from the extruder 34 (e.g., a twin screw extruder), into an analogue inlet 100, into a channel 103, and across an extrusion plane 104. The lower part 82 of the die 10 may further comprise an extrusion portion inlet 102 positioned between the analogue inlet 100 and the channel 103. The extrusion portion inlet 102 may reduce an area of the flow path of the dough 31 as the dough 31 moves from the analogue inlet 100 to the channel 103. The extrusion portion inlet 102 may provide a consistent diameter flow restriction prior to dough 31 entering the channel 103. For example, a connection positioned at the analogue inlet 100 may be of different sizes depending on the specific extruder used and/or the specific connection between an extruder and the die 10. Accordingly, a more consistent product may be achieved through the use of the extrusion portion inlet 102.

As the dough 31 enters the channel 103 from the extrusion portion inlet 102, the dough 31 may extend along the channel 103 as shown by the direction of flow 101 arrows. While not shown in FIG. 3, at the each end of the channel 103 the flow can be blocked by side portions of the die 10. When the dough 31 is blocked by the side portions, the dough 31 is forced (e.g., by the pressure from the extruder 34) across the extrusion plane 104 and over a die lip 105 as shown by the direction of flow 101 arrows. In a preferred embodiment, a cross sectional area of the flow path of the dough 31 in the channel 103 is greater than a cross sectional area of the flow path of the dough 31 across the extrusion plane 104.

A fat and/or a fat analogue may be injected into the dough 31 as the dough 31 moves through the die 10. While not shown in FIG. 3, the extrusion plane 104 and/or the die lip 105 may comprise one or more injection ports. The injection ports may be configured to inject the fat and/or the fat analogue into the dough 31. The fat may alternatively be injected through a slit immediately after the die exit. The geometry can be adapted to increase the void in between the fibers to optimize the fat injection in the slab.

Figure 4:
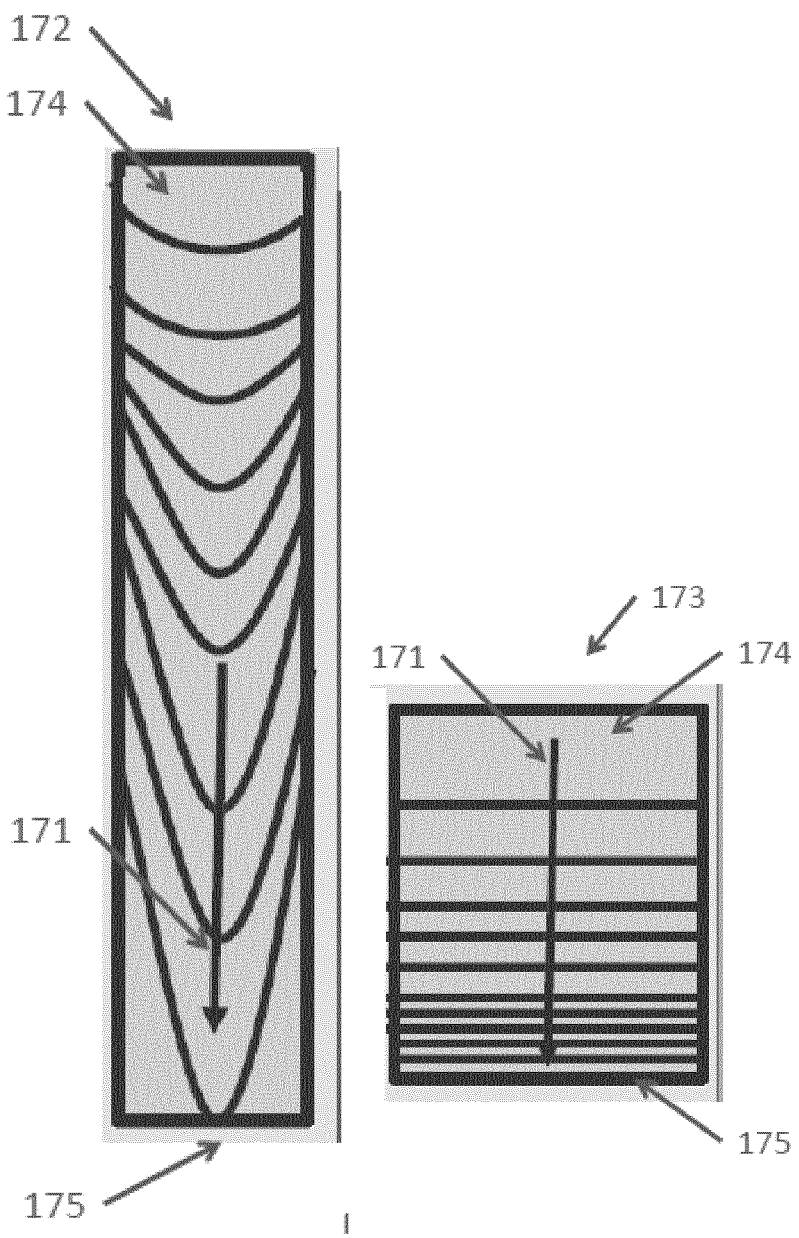
FIG. 4 illustrates an embodiment of a fiber creation orientation diagram according to the present disclosure.

FIG. 4 illustrates an embodiment of a fiber creation orientation diagram. In general, fiber creation orientation may change depending on the length of the die 10 as the dough 31 moves down the die 10 in a direction of flow 171. The lines shown on the cross section of the dies in FIG. 4 indicate a general orientation of fibers that may be created in the dough 31 and/or a velocity profile of the dough 31 as the dough 31 moves through the dies in FIG. 4. For example, in a traditional long-type die the fiber orientation may be as shown in diagram 172. In contrast to the die shown in diagram 172, the die 10 according to the embodiments disclosed herein, for example a short die, may have the general orientation of fibers and/or the velocity profile as shown in diagram 173.

Referring back to diagram 172, the fibers (as represented by the lines) and/or the velocity profile may be similar to a Hagen-Poiseuille flow distribution as the dough 31 moves from a die inlet 174 to a die outlet 175. Accordingly, the longer the distance from the die inlet 174 to the die outlet 175, the more the fibers become parallel to the direction of flow 171. However, in diagram 173, the fibers remain perpendicular to the direction of flow 171 from the die inlet 174 to the die outlet 175. Accordingly, the preferred embodiment of the die 10 according to the present disclosure (e.g., a short die) and the diagram 173 can achieve a more desirable and predictable manufacturing process using the dough 31.

The fibers may be created in the die 10 when the length of the die 10 and the pressure conditions of the dough 31 create a periodical flow instability in the die 10. The periodical flow instability may result in a periodical pressure oscillation. The pressure oscillation may occur at a particular shear rate and shear stress. When the pressure oscillation occurs, the dough 31, which may include a protein, may not be given time to relax. For example, an article entitled "Polymer Processing Extrusion Instabilities and Methods for their Elimination or Minimisation" by Agassant, J.-F. et al. published on polymer-process.com reviews findings related to instabilities in polymer processing. (Agassant, J.-F. et al., *Polymer Processing Extrusion Instabilities and Methods for their Elimination or Minimisation*, International Polymer Processing (XXI), 2006-3, at 239.).

When the die 10 is a short die the dough 31 may not relax and therefore may retain the properties of the pressure oscillation. When the properties of the pressure oscillation are maintained, a sheared fiber and gap structure may be created. The speed at which the dough 31 moves through the die 10 and the decompression of the dough 31 due to shear stress may influence the periodical instability of the dough 31 as it moves through the die 10.

For example, as the shear rate of the dough 31 increases, the shear stress of the dough 31 may generally also increase. At a relatively low shear rate, the shear stress is relatively low and the flow of the dough 31 through the die 10 may be generally laminar. In contrast, at a relatively high shear rate, the shear stress may be relatively high and the flow of the dough 31 through the die 10 may be generally grossly fractured or turbulent. However, at a shear rate between a relatively low and a relatively high shear rate, pressure oscillations may occur along the flow of the dough 31. When pressure oscillations occur, the dough 31 may expand along the direction of flow through the die 10 to form voids. The dough 10 that remains between the voids may become the fibers shown in FIG. 4. Thereafter, a fat and/or fat analogue may be injected into and/or otherwise introduced within the voids to substantially fill the voids.

In an embodiment, when the dough 31 is below a critical temperature, a phase separation of the dough 31 may occur. Therefore, the temperature of the dough 31 may be reduced while passing through the die 10. Further temperature reduction of the dough 31 may solidify the dough 31 and/or may set the structure of the dough 31. If the structure of the dough 31 is set during the phase separation of the dough 31, the dough 31 may retain a fibrous meat-like appearance including sheared fibers. In addition to temperature, flow output and viscosity of the dough 31 may change the properties of the fibers created in the dough 31.

FIG. 5 illustrates an embodiment of a processed food analogue 181 exiting from a die 10 with the sheared fibers 71 and gaps 72 between the sheared fibers 71, a "sheared fiber and gap structure." As described in reference to FIG. 4, the sheared fibers 71 that remain substantially perpendicular to a direction of flow 171 of the dough 31 are desirable when producing a meat analogue. As used herein, substantially perpendicular may include sheared fiber orientations that are about +/−15 degrees from a direction perpendicular to the direction of flow. In some embodiments, sheared fibers 71 that remain substantially perpendicular to the direction of flow 171 may be bounded by smaller fibers at other angles relative to the direction of flow. However, even when considering the smaller fibers as included in the sheared fibers 71, an average angle of the sheared fibers 71 with respect to the direction of flow 171 may remain substantially perpendicular to the direction of flow 171.

Figure 6:
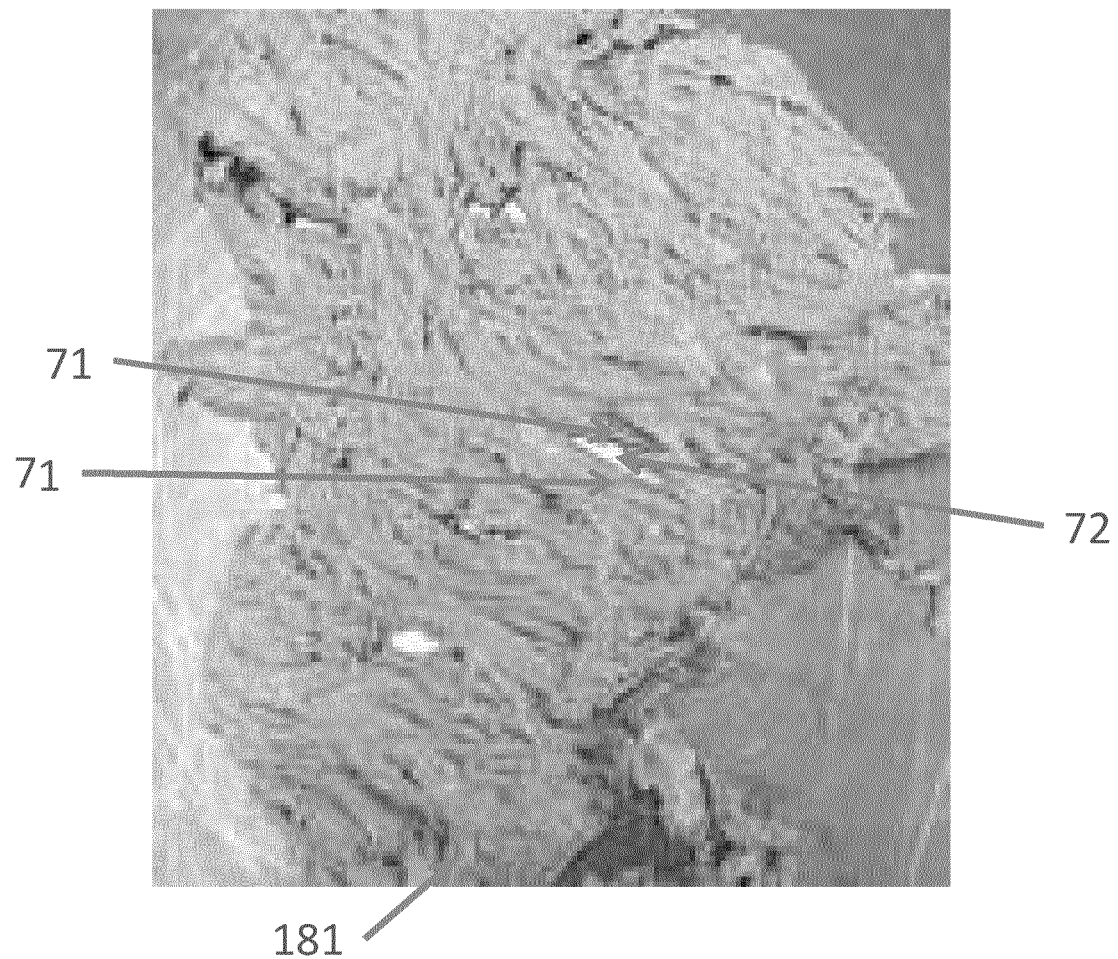
FIG. 6 illustrates an embodiment of a meat analogue with a sheared fiber and gap structure.

FIG. 6 illustrates an embodiment of a meat analogue with the sheared fiber and gap structure. In FIG. 6 the processed food analogue 181 has been removed from the die 10. The sheared fibers 71 and the gaps 72 between the sheared fibers are shown in the processed food analogue 181. FIG. 6 illustrates an embodiment of a substantially non-homogenous meat analogue structure.

Figure 7:
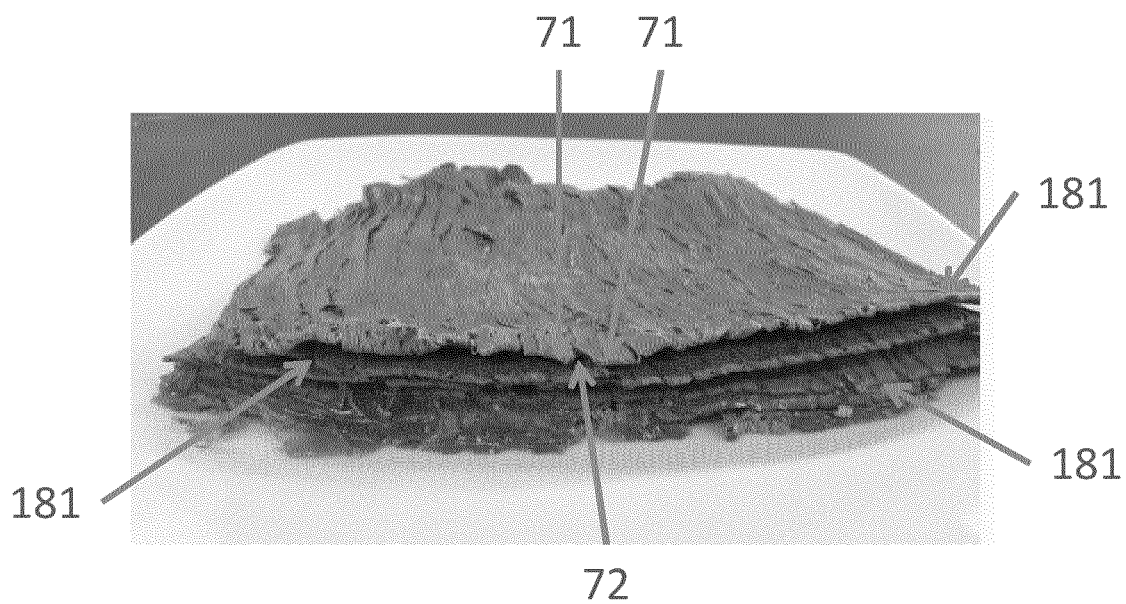
FIG. 7 illustrates stacked sheets of an embodiment of a meat analogue with a sheared fiber and gap structure.

FIG. 7 illustrates stacked sheets of an embodiment of a meat analogue with the sheared fiber and gap structure. In FIG. 7 the processed food analogue 181 has been removed from the die 10 and stacked. The sheared fibers 71 and the gaps 72 between the sheared fibers are shown in the processed food analogue 181. In some embodiments, the stacked sheets of the meat analogue with the sheared fiber and gap structure may be immersed into a fat and/or fat analogue. In some embodiments, the meat analogue with the sheared fiber and gap structure may be immersed in and/or sprayed with the fat and/or fat analogue. In either and/or both cases, the fat may fill the voids of the gap structure in the meat analogue to yield a marbled meat analogue. Such processes may be used in conjunction with and as an alternative to fat injection processes.

Figure 8:
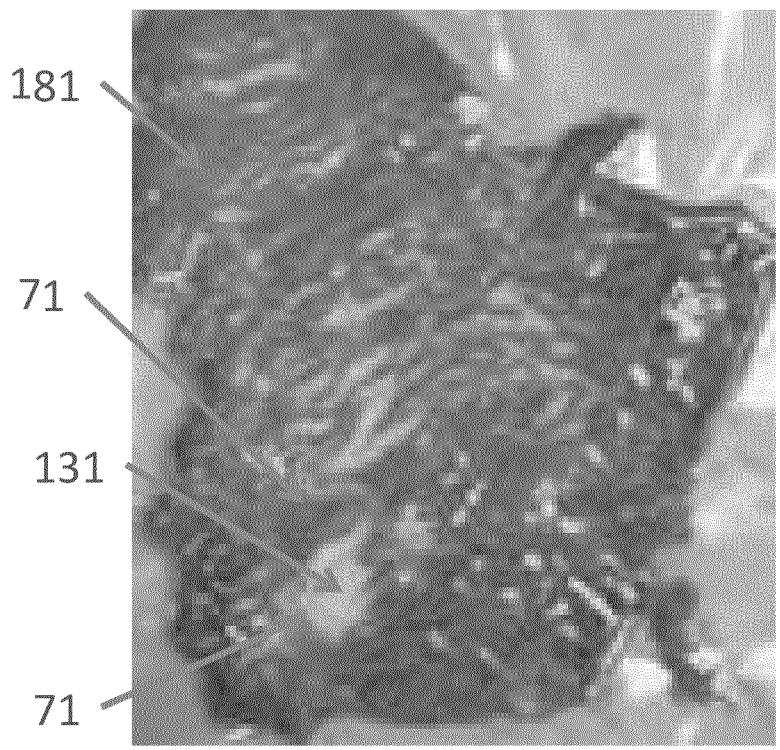
FIG. 8 illustrates an embodiment of a meat analogue with a sheared fiber and gap structure where a fat has been injected to fill the gaps between the sheared fibers.

FIG. 8 illustrates an embodiment of a meat analogue with the sheared fiber and gap structure where a fat 131 has been injected to fill the gaps between the sheared fibers. FIG. 8 illustrates an embodiment of a substantially steak-like color and shape. The fat 131 may be a high melting point fat and/or fat analogue. The fat 131 may fill the gaps 72 created by the flow instability of the dough 31 as the dough 31 moves through the die 10. The processed food analogue 181 including the fat 131 in the gaps 72 may improve mouthfeel perception for a consumer when compared to the processed food analogue 181 without the inclusion of the fat 131.

For example, the die 10 may include fat injection sites in the die 10 that inject the fat or the fat analogue into the dough 31 as the dough 31 moves through the die 10 to yield visually distinct regions of (1) a fat and/or fat analogue and (2) a plant and/or vegetable protein in the processed food analogue 181. In such an embodiment, the visually distinct regions are connected but not substantially mixed. For example, substantially all or completely all of the plant and/or vegetable protein can be confined to one or more visually distinct regions of the analogue (e.g., a body and/or macrostructure of the analogue), and/or substantially or completely all of the injected fat can be confined to one or more other visually distinct regions of the analogue (e.g., within one or more gaps in the body of the analogue). As shown in FIG. 8, the meat analogue with the sheared fiber and gap structure where the fat 131 has been injected to fill the gaps may create a plurality of alternating, visually distinct regions (i.e., fat, macrostructure, fat, macrostructure, etc.) in the meat analogue. The fat injection sites may further inject lard and/or tallow flavor in addition to the fat and/or the fat analogue to optimize meat flavor release in the mouth of a consumer.

FIG. 9 illustrates an additional or alternative embodiment of a meat analogue with the sheared fiber and gap structure. FIG. 9 illustrates an embodiment of a processed food analogue 181 exiting from a die 10 with the sheared fibers 71 and gaps 72 between the sheared fibers 71. As described in reference to FIGS. 4 and 5, the sheared fibers 71 that remain substantially perpendicular to a direction of flow 171 of the dough 31 are desirable when producing a meat analogue.

Figure 10:
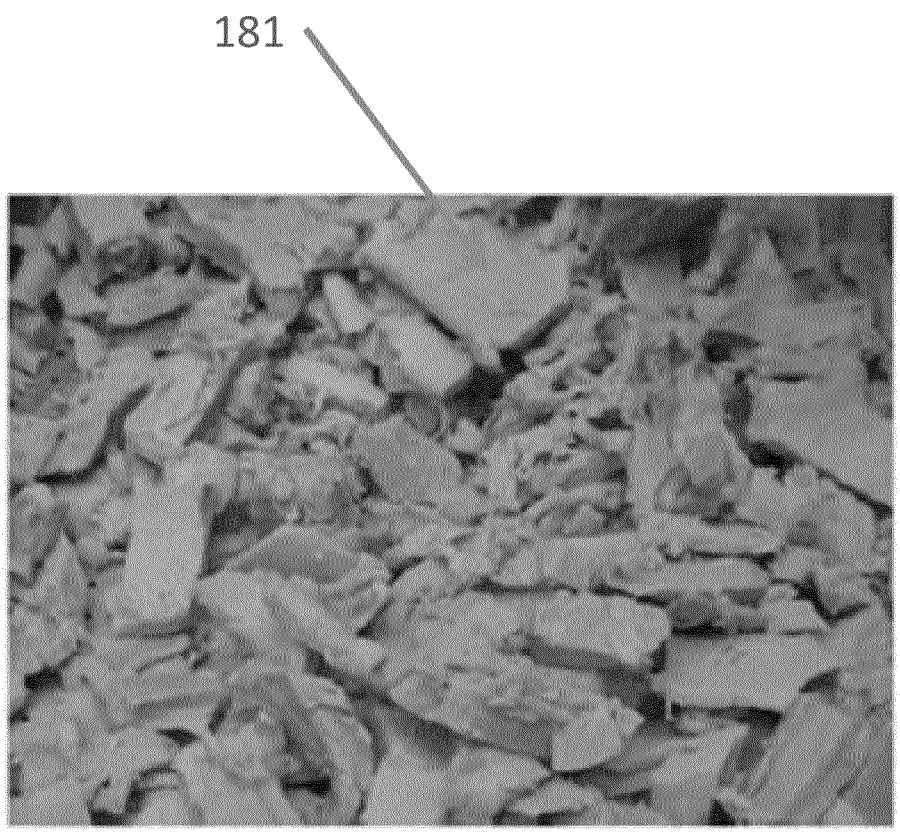
FIG. 10 illustrates a meat analogue with a compact homogeneous structure.

FIG. 10 illustrates a meat analogue with an undesirable compact, substantially homogeneous structure. In contrast, preferred embodiments of the meat analogue comprise a non-homogenous structure with a fiber-like appearance. The meat analogue in FIG. 10 has been cut after passing through a cooling die that is not a short cooling die. Notably, there is no sheared fiber and gap structure in the embodiment of a meat analogue according to FIG. 10.

EXAMPLE EMBODIMENTS

Several non-limiting example embodiments of dough and dough extrusion devices and processes are provided hereafter.

Example 1

In this example a twin screw extruder with a diameter of 25 mm is used to prepare a structured meat analogue having aligned fibers on the basis of wheat gluten proteins. A dough is prepared in a mixer at 30 rpm by mixing the ingredients provided in Table 1.

TABLE 1

| Ingredient | Weight (kg) |
| --- | --- |
| Vital Wheat gluten | 8.5 |
| Precipitated Calcium Carbonate | 4.5 |
| Water | 12.5 |

The mixture is mixed for three minutes to form a homogeneous dough. This dough is then pumped to the first barrel of the extruder at 15 kg/h. The extruder temperature is set according to Table 2.

TABLE 2

| | Barrel 1 | Barrel 2 | Barrel 3 | Barrel 4 | Barrel 5 | Barrel 6 | Barrel 7 | Barrel 8 | Barrel 9 | Barrel 10 | Exit to the die |
| --- | --- | --- | --- | --- | --- | --- | --- | --- | --- | --- | --- |
| T °C. | 20 | 20 | 75 | 130 | 165 | 165 | 165 | 165 | 100 | 75 | |

A die is connected to the exit of the extruder and water circulation in the die is set at 80° C. to maintain temperature of the die below 95° C. Flavor and coloring ingredients are injected into barrel 10 for adjusting the extruded product color and flavor to reproduce beef veal or chicken meat organoleptic properties.

After equilibration of the flow and temperature of the extrusion and die, a texturized meat analogue with fibers in average perpendicularly aligned to the direction of flow of dough at the exit of the die is produced.

Example 2

In this example a twin screw extruder with a diameter of 25 mm is used to prepare a structured meat analogue having aligned fibers on the basis of wheat gluten proteins. A dough is prepared in a mixer at 30 rpm by mixing the ingredients provided in Table 3.

TABLE 3

| Ingredient | Weight (kg) |
| --- | --- |
| Vital Wheat gluten | 2.15 |
| Pea protein isolate 1 (84% protein) | 2.5 |
| Pea protein isolate 2 (86% protein) | 2.5 |
| Salt | 0.1 |
| Flavor 1 | 0.09 |
| Flavor 2 | 0.016 |
| Flavor 3 | 0.034 |
| Flavor 4 | 0.210 |
| Protein texturized particles | 1.65 |
| Water | 10.9 |

The mixture is mixed for three minutes to form a homogeneous dough. This dough is then pumped to the first barrel of the extruder at 15 kg/h. The extruder temperature is set according to Table 2.

A die is connected to the exit of the extruder and water circulation in the die is set at 80° C. to maintain temperature of the die below 95° C. Flavor and coloring ingredients are injected into barrel 10 for adjusting the color and flavor of the extruded product to reproduce pork meat organoleptic properties.

After equilibration of the flow and temperature of the extrusion and die, a texturized meat analogue with fibers in average perpendicularly aligned to the direction of flow of dough at the exit of the die is produced.

Example 3

In this example a twin screw extruder with a diameter of 25 mm is used to prepare a structured meat analogue having aligned fibers on the basis of wheat gluten proteins. An emulsion is prepared by homogenizing a mixture according to Table 4 at pressures of 50 and 150 bars.

TABLE 4

| Ingredient | Weight (kg) |
| --- | --- |
| Soya protein isolate | 0.204 |
| Canola oil | 0.54 |
| Water | 11.3 |

Then, a dough is prepared in a mixer at 30 rpm by mixing the ingredients provided in Table 5.

TABLE 5

| Ingredient | Weight (kg) |
| --- | --- |
| Vital Wheat gluten | 2.15 |
| Pea protein isolate 1 (84% protein) | 2.5 |
| Pea protein isolate 2 (86% protein) | 2.5 |
| Salt | 0.1 |
| Flavor 1 | 0.09 |
| Flavor 2 | 0.016 |
| Flavor 3 | 0.034 |
| Flavor 4 | 0.210 |
| Protein texturized particles | 1.65 |
| Water | 10.9 |
| Emulsion | 12 |

The mixture is mixed for three minutes to form a homogeneous dough. This dough is then pumped into the first barrel of the extruder at 15 kg/h. The extruder temperature is set according to Table 2.

A die is connected to the exit of the extruder and water circulation in the die is set at 80° C. to maintain temperature of the die below 95° C. Flavor and coloring ingredients are injected into barrel 10 for adjusting the extruded meat analogue color and flavor to reproduce sausage organoleptic properties. The completed meat analogue contains about 2.5% fat to simulate a nutritional meat composition.

Example 4

In this example a twin screw extruder with a diameter of 25 mm is used to prepare a structured meat analogue having aligned fibers on the basis of soya and wheat gluten proteins (50:50) and pea and faba bean protein isolates (60:40). An emulsion is prepared as described in Example 3. Then, the dough is prepared in a mixer at 30 rpm by mixing the ingredients provided in Table 6.

TABLE 6

| Ingredient | Soya and wheat gluten (50:50) Weight (kg) | Pea and Faba (60:40) Weight (kg) | Pea and Soya (60:40) Weight (kg) |
| --- | --- | --- | --- |
| Soya protein | 5 | — | 4 |
| Vital wheat gluten | 5 | — | — |
| Pea protein isolate | — | 6 | 6 |
| Faba bean protein isolates | — | 4 | — |
| Precipitated calcium carbonate | 1.2 | 1.2 | 2.4 |
| Red color | 0.2 | 0.2 | 0.2 |
| Water | 16 | 15 | 16.5 |

The mixtures are mixed for three minutes to form a homogeneous dough. The doughs are then pumped into the first barrel of the extruder at 15 kg/h. The extruder temperature is set according to Table 2.

Figure 11:
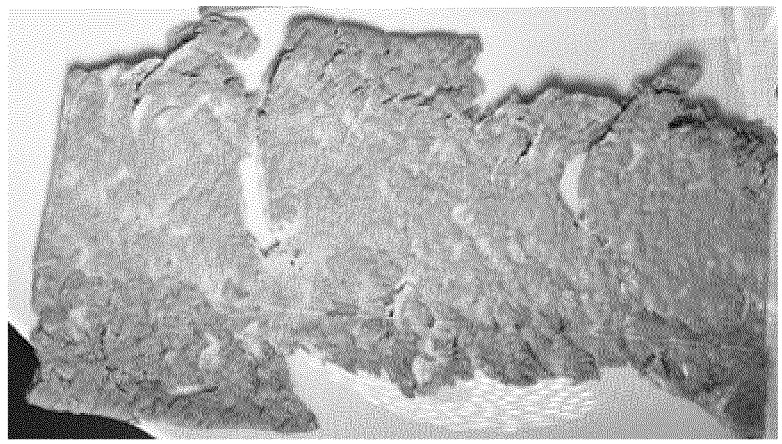
FIG. 11 illustrates a meat analogue for a soya and wheat gluten blend.
Figure 12:
FIG. 12 illustrates a meat analogue for a pea and faba bean blend.
Figure 13:
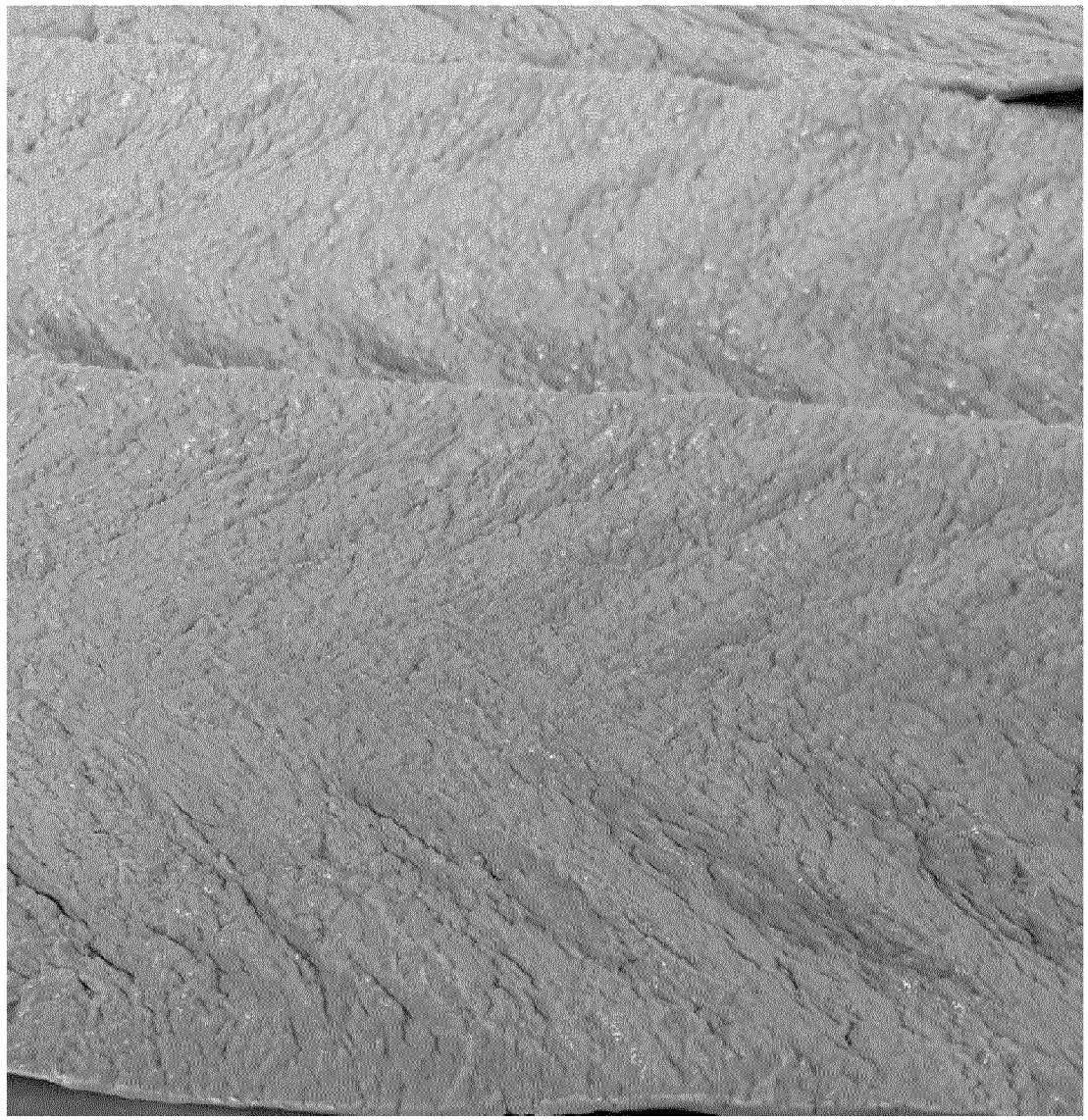
FIG. 13 illustrates a meat analogue for a pea and soya protein blend
Figure 14:
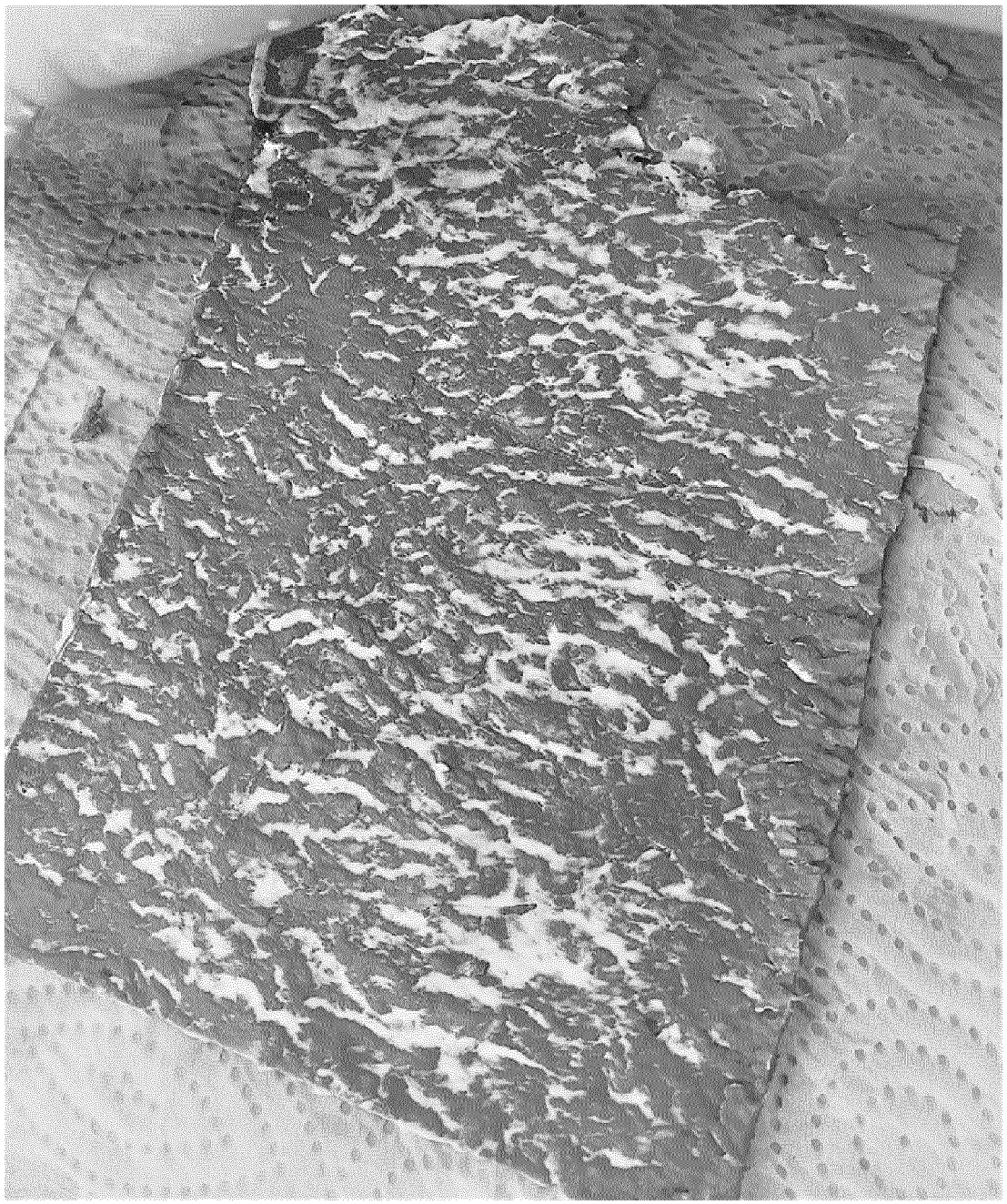
FIG. 14 illustrates a pea and faba bean meat analogue piece with fat analogue inclusion in the fiber structure.

A die is connected to the exit of the extruder and water circulation in the die is set at 80° C. to maintain temperature of the die below 95° C. Fat was injected at the exit of the 2D short die with three injection ports in a slit along the die slit length. Flavor and coloring ingredients are injected into barrel 10 for adjusting the extruded meat analogue color and flavor to reproduce sausage organoleptic properties. The completed meat analogue contains about 2.5% fat to simulate a nutritional meat composition. FIG. 11 shows the meat analogue for the soya and wheat gluten blend. FIG. 12 shows the meat analogue for the pea and faba bean blend. FIG. 13 shows the meat analogue for the pea and soya protein blend, FIG. 14 show the pea and faba bean meat analogue piece with fat analogue inclusion in the fiber structure.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. Further, the present embodiments are thus not to be limited to the precise details of methodology or construction set forth above as such variations and modification are intended to be included within the scope of the present disclosure. Moreover, unless specifically stated any use of the terms first, second, etc. do not denote any order or importance, but rather the terms first, second, etc. are merely used to distinguish one element from another.

What is claimed is:

1. A method of extruding a meat analogue comprising a vegetable protein, the method comprising:
applying a pressure to the meat analogue with an extruder;
passing the meat analogue through a short die in a direction of flow, wherein the short die is part of and/or connected to the extruder, and the short die is a die where the length of the die, defined as the length a material travels through the die when the die is in use, is less than the width of the die, defined as the longest dimension of a planar section of the die outlet through which the material passes when exiting the die;
creating a texture of sheared fibers in the meat analogue substantially perpendicular to the direction of flow of the meat analogue as the meat analogue is passed through the short die;
injecting a fat or a fat analogue into the meat analogue as the meat analogue is passed through the short die such that the fat or the fat analogue is embedded in but visually distinct from the meat analogue, wherein the fat analogue comprises at least one of a hydrocolloid or a gellified emulsion of fat and protein; and
creating a periodical increase or decrease in a flow rate within the meat analogue when the meat analogue is passed through the short die.

2. The method according to claim 1, the method further comprising adding one or more insoluble particles of vegetable origin.

3. The method according to claim 1, the method further comprising adding a pea hull to the meat analogue.

4. The method according to claim 1, the method further comprising maintaining the short die at a temperature below about the boiling temperature of water according to a temperature and a pressure in the meat analogue at the exit of the short die.

5. The method according to claim 1, the method further comprising cutting the meat analogue to resemble a marbled beef steak.

6. The method according to claim 1, wherein the meat analogue contains a pea protein or faba bean protein.

7. The method according to claim 1, the method further comprising cooling the meat analogue from an initial temperature while passing the meat analogue through the short die.

8. The method according to claim 1, the method further comprising maintaining the short die at a temperature between about 70° C. and about 90° C.

9. The method according to claim 1, wherein the short die is selected from the group consisting of a coat hanger die, a fish-tail die, and a combination thereof.

10. The method according to claim 1, wherein the creating the texture of sheared fibers in the meat analogue comprises creating the texture of sheared fibers in the meat analogue within about ±15 degrees to a direction perpendicular to the direction of flow of the meat analogue as the meat analogue is passed through the short die.

11. The method according to claim 1, wherein the meat analogue comprises an emulsion product that resembles one or more pieces of natural meat in appearance, texture, and physical structure.

12. The method according to claim 1, wherein the meat analogue does not include natural meat.

* * * * *